(12) United States Patent
Gao

(10) Patent No.: US 8,897,646 B2
(45) Date of Patent: *Nov. 25, 2014

(54) OPTICAL ADD/DROP MULTIPLEXER

(71) Applicant: Tianjin GP Photonics. Inc., Tianjin (CN)

(72) Inventor: Peiliang Gao, Tianjin (CN)

(73) Assignee: GP Photonics, Inc., Tianjin (CN)

( * ) Notice: Subject to any disclaimer, the term of this patent is extended or adjusted under 35 U.S.C. 154(b) by 38 days.

This patent is subject to a terminal disclaimer.

(21) Appl. No.: 13/631,880

(22) Filed: Sep. 29, 2012

(65) Prior Publication Data
US 2013/0028604 A1  Jan. 31, 2013

Related U.S. Application Data

(63) Continuation-in-part of application No. PCT/CN2010/072624, filed on May 11, 2010.

(30) Foreign Application Priority Data

Apr. 1, 2010 (CN) .......................... 2010 1 0137637

(51) Int. Cl.
    *H04J 14/02* (2006.01)
(52) U.S. Cl.
    USPC ................. 398/83; 398/79; 398/85; 398/65; 398/48; 398/33; 398/38; 398/159; 385/24; 385/37; 385/16; 385/17; 385/18

(58) Field of Classification Search
    CPC ... H04J 14/02; H04J 14/0201; H04J 14/0202; H04J 14/021; H04J 14/0212
    USPC ........... 398/83, 79, 82, 85, 87, 33, 38, 25, 34, 398/45, 48, 59, 65, 158, 159; 385/24, 37, 385/16, 17, 18
    See application file for complete search history.

(56) References Cited

U.S. PATENT DOCUMENTS 7,853,148 B2 * 12/2010 Akiyama et al. ................ 398/83
8,131,150 B2 *  3/2012 Feuer et al. ..................... 398/83
8,452,180 B2 *  5/2013 Gao .................................. 398/85

* cited by examiner

*Primary Examiner* — Hanh Phan
(74) *Attorney, Agent, or Firm* — Matthias Scholl P.C.; Matthias Scholl

(57) ABSTRACT

An optical add/drop multiplexer including one or more optical drop multiplexers connected in free space or fused by optical fiber pigtails, a wavelength blocker with an input port connected to an output port of the optical drop multiplexer through the fusion of the fiber pigtails, one or more optical add multiplexers connected in free space or fused by fiber pigtails, a digital signal processor, an analog-to-digital signal converter, a digital-to-analog converter, and a plurality of electronic control and feedback loops for tuning and scanning an optical wavelength.

20 Claims, 24 Drawing Sheets

OPTICAL ADD/DROP MULTIPLEXER

CROSS-REFERENCE TO RELATED APPLICATIONS

This application is a continuation-in-part of International Patent Application No. PCT/CN2010/072624 with an international filing date of May 11, 2010, designating the United States, and further claims priority benefits to Chinese Patent Application No. 201010137637.7 filed Apr. 1, 2010. The contents of all the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention belongs to the field of optical fiber communication, and more particularly to an optical add/drop multiplexer.

2. Description of the Related Art

Wavelength division multiplexing (WDM) is often used in optical fiber communication network to increase the information capacity for network transmission. In a WDM system, multiple signals are transmitted in the same communication path at different optical wavelengths, each wavelength is subjected to intensity modulation via different electric signals, and then, the modulated lights are combined into one communication path by an optical multiplexer, and at a receiver end, different wavelengths are separated by an optical demultiplexer and guided to different detectors.

The WDM system can be two types based on its channel quantity and spacing, i.e. coarse type and dense type. A coarse wavelength division multiplexing (CWDM) system has a smaller number of channels and larger wavelength spacing (usually 20 nanometers or more). A dense wavelength division multiplexing (DWDM) system a larger number of channels (more than 8) and small wavelength spacing, the common wavelength spacing is approximately from 0.2, 0.4 to 1.6 nanometers. DWDM is applied to high-level systems in communication hierarchy, however, it is more difficult and challenging to design than CWDM system.

The optical add/drop multiplexer (OADM) is an important routing apparatus used in communication network. An optical add/drop multiplexer can classify different wavelengths, separates and removes one wavelength component, and adds and inserts one new wavelength component, and all the wavelength components are combined into a single beam by the multiplexer. There are some problems in existing optical add/drop multiplexers, such as slow response, difficult to extend and high manufacturing cost, etc.

SUMMARY OF THE INVENTION

In view of the above-described problems, it is one objective of the invention to provide an optical add/drop multiplexer having quick response, easy extension, and low manufacturing cost.

To achieve the above objective, in accordance with one embodiment of the invention, there is provided an optical add/drop multiplexer comprising: one or more optical drop multiplexers connected in free space or fused by fiber pigtails, a wavelength blocker, one or more optical add multiplexers connected in the free space or fused by fiber pigtails, a digital signal processor, an analog-to-digital signal converter, a digital-to-analog signal converter, and a plurality of electronic control and feedback loops, wherein the optical drop multiplexer comprises three ports: an input port used for receiving a multi-wavelength signal, a drop port used for outputting a drop signal, and an output port used for transmitting the multi-wavelength signal to a next optical drop multiplexer or to an input port of the wavelength blocker;

the input port of the wavelength blocker is connected to the output port of the optical drop multiplexer through the fusion of the fiber pigtails, and is used to receive the multi-wavelength signal, block a selected wavelength, and transmit other wavelengths to an output port;

the optical add multiplexer comprises three ports: an input port connected to the output port of the wavelength blocker, and used to receive the multi-wavelength signals except the drop signal, an add port used for inputting an add signal, and an output port used for transmitting the multi-wavelength signal to the next optical add multiplexer or to a multi-wavelength signal processing system;

the digital signal processor is used for receiving, outputting, and processing digital and analog electronic signals;

the analog-to-digital signal converter is used for receiving an optical power signal output from the drop multiplexer and the add multiplexer, and converting an analog signal into a digital signal, and outputting the digital signal to the digital signal processor for signal processing;

the digital-to-analog converter is used for receiving a signal sent from the digital signal processor, converting the digital signal into an analog signal, and outputting the analog signal to a radio frequency signal source for tuning the wavelength of the drop or add signal; and the plurality of electronic control and feedback loops are used for tuning and scanning an optical wavelength.

In a class of this embodiment, the multi-wavelength signal is a multi-channel coarse wavelength division multiplexed signal, or a multi-channel dense wavelength division multiplexed signal.

In a class of this embodiment, a wavelength spacing between adjacent channels of the multi-channel coarse wavelength division multiplexing signal is approximately 20 nanometers.

In a class of this embodiment, a wavelength spacing between adjacent channels of the multi-channel dense wavelength division multiplexing signal is approximately 0.8 nanometers in a 100 GHz DWDM system, or approximately 0.4 nanometers in a 50 GHz DWDM system.

In a class of this embodiment, the optical drop multiplexer further comprises an acousto-optic tunable filter, an optical polarization power combiner, first and second optical beam splitters, first and second optical power detectors; the multi-wavelength signal is incident, at a Bragg angle, to the acousto-optic tunable filter in a direction opposite to an acoustic wave propagation direction, the first and the second optical beam splitters are disposed between the acousto-optic tunable filter and the optical polarization power combiner to reflect a part of light outputted from the acousto-optic tunable filter to the first and the second optical power detectors respectively; and the optical signal transmitted from the optical beam splitters is input to the optical polarization power combiner.

In a class of this embodiment, the optical add multiplexer further comprises an acousto-optic tunable filter, an optical polarization power splitter, and third and fourth optical power detectors; the optical polarization power splitter receives the multi-wavelength signal from the output port of the wavelength blocker and splits the multi-wavelength signal into two linearly polarized lights with the planes of polarization orthogonal to each other in the horizontal and vertical directions; the linearly polarized light in the horizontal direction is incident, at a Bragg angle, to the acousto-optic tunable filter in the direction opposite to the acoustic wave propagation direction; the linearly polarized light in the vertical direction is incident, at a Bragg angle, with respect to an incident angle of the multi-wavelength signal, to the acousto-optic tunable filter in the same direction as the acoustic wave propagation direction; and the third and the fourth optical power detectors are used for receiving zero-order optical signals of the two add signals from the acousto-optic tunable filter.

In a class of this embodiment, the acousto-optic tunable filter comprises an acousto-optic crystal, one or more transducers bonded to the acousto-optic crystal, and an electric RF power source for providing a radio frequency signal to drive the acousto-optic tunable filter, and detecting and processing an incident optical signal by changing the frequency of the radio frequency signal.

In a class of this embodiment, the optical polarization power combiner comprises first and second input ports having polarization maintaining fiber pigtails with GRIN lenses at pigtail ends for light signal collimating, and one output port with a pigtailed single mode fiber; the optical polarization power combiner combines two linearly polarized optical signals with the polarization planes orthogonal to each other from the acousto-optic tunable filter, into a drop signal, and then outputs the drop signal to the output port.

In a class of this embodiment, the optical polarization power splitter comprises first and second output ports having polarization maintaining fiber pigtails with GRIN lenses at pigtail ends for light signal collimating, and one input port with a pigtailed single mode fiber; the optical polarization power splitter splits the add signal into two linearly polarized signals with planes of polarization orthogonal to each other, and then outputs the optical signals to the acousto-optic tunable filter at a Bragg angle.

In a class of this embodiment, the optical properties of the acousto-optic tunable filter meet the optical spectrum requirements of the multi-wavelength signal.

In a class of this embodiment, the spectral characteristics of the optical power detector are within an input signal spectral region.

In a class of this embodiment, the acousto-optic crystal is an anisotropic birefringent crystal.

In a class of this embodiment, a surface receiving or outputting optical signals of the acousto-optic crystal is coated with anti-reflection dielectric thin films.

In a class of this embodiment, the input port, drop port, add port, and output port are all provided with single mode fibers.

In a class of this embodiment, the radio frequency signal provided by the electric RF power source to drive the acousto-optical tunable filter has energy and radio frequency bandwidth to satisfy the scanning and dropping of the multi-wavelength signal, or the scanning and adding of the multi-wavelength signal.

In a class of this embodiment, the reflectivity of the first and second light splitters is approximately 5% and the transmittance of the first and second light splitters is approximately 95%.

Advantages of the invention are summarized below:

1. The optical add/drop multiplexer has the functions of adding and dropping from one or more ports or to one or more ports by means of acousto-optic tunable filter (AOTF), optical polarization power combiner (OPPC) and optical polarization power splitter (OPPS), and has the characteristics of quick response with sub-millisecond level wavelength switching time and short execution time.

2. The optical add/drop multiplexer is substantially transparent for an incident wavelength that does not meet the Bragg diffraction condition, and this feature makes it possible to use a plurality of AOTFs connected in a serial way, and all the add ports and drop ports are colorless, that is to say, every add/drop port can be setup to add/drop any single wavelength or a band of wavelength from the input signal.

3. The coupling of the optical add/drop multiplexer between the acousto-optic tunable filter (AOTF) and the wavelength blocker (WB) is implemented by fusing fiber pigtails of every apparatus connected in series, The use of fiber connection by fiber fusion has the advantage of the modularized manufacturing, and the high volume production at low cost can be realized.

4. The optical add/drop multiplexer can determine the wavelength of drop and add signals accurately by scanning the radio frequency source driving the AOTF, hence, the ROADM can be used in the dense wavelength division multiplexing (DWDM) and in the coarse wavelength division multiplexing (CWDM) systems by selecting a matched wavelength blocker.

5. The invention has the characteristics of compact design, quick response, short execution time, easy extension and low cost, and can be used in the dense wavelength division multiplexing (DWDM) and the coarse wavelength division multiplexing (CWDM) systems.

BRIEF DESCRIPTION OF THE DRAWINGS

FIG. 6-1 shows the Bragg diffraction of an acousto-optic tunable filter (AOTF) used in an optical drop multiplexer;

FIG. 6-2 shows a horizontal polarization component of Bragg diffracted light;

FIG. 6-3 shows a vertical polarization component of Bragg diffracted light;

FIG. 12-1 shows Bragg diffraction of an acousto-optic tunable filter (AOTF) used in an optical add multiplexer;

FIG. 12-2 shows a horizontal polarization component of Bragg diffracted light;

FIG. 12-3 shows a vertical polarization component of Bragg diffracted light;

DETAILED DESCRIPTION OF THE EMBODIMENTS

For further illustrating the invention, experiments detailing an optical add/drop multiplexer are described below. It should be noted that the following examples are intended to describe and not to limit the invention.

The preferred embodiment of the extensible and reconfigurable optical add/drop multiplexer is described in details below in conjunction with reference drawings, wherein identical reference numbers correspond to the identical components. Exemplary reference of an optical wavelength or a channel should be understood as an optical signal having a central wavelength and a particular bandwidth.

Figure 1:
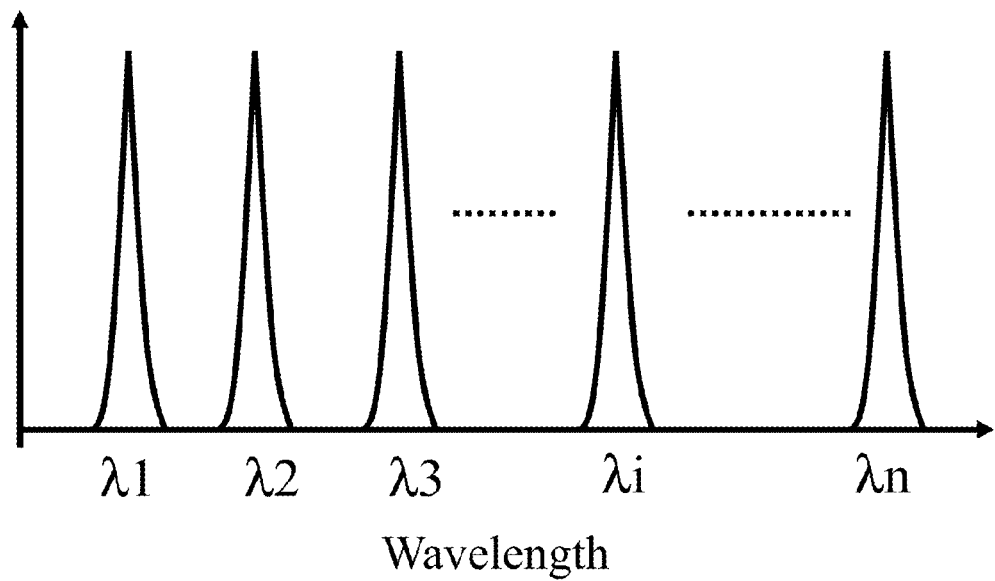
FIG. 1 is a schematic diagram of a multi-wavelength optical signal.

FIG. 1 shows a typical multi-wavelength optical signal with the equal channel spacing. The channel spacing is measured from the center of one channel to the center of adjacent channels. The multi-wavelength signal may be a multi-channel coarse wavelength division multiplexing (CWDM) signal, and the wavelength spacing between adjacent channels is approximately 20 nanometers; the multi-wavelength signal is also a multi-channel dense wavelength division multiplexing (DWDM) signal with the wavelength spacing of a 100 GHz DWDM system being approximately 0.8 nanometers, or the multi-wavelength signal is a multi-channel dense wavelength division multiplexing (DWDM) signal with the wavelength spacing of a 50 GHz DWDM system being approximately 0.4 nanometers.

A reconfigurable optical add/drop multiplexer (ROADM) may be achieved in multiple ways, including tunable filter technology, microelectronic mechanical system (MEMS), liquid crystal technology, thermo-optic effect, optical beam switch technology based on planar waveguide circuit, or a free space implementation scheme using volume diffraction grating, or array waveguide grating (AWG).

All the technologies mentioned above have some advantages and disadvantages. An acousto-optical tunable filter (AOTF) based ROADM and wavelength selective switch has some advantages in performances, cost, extensibility, and easy manufacture, thus, provides a viable solution for wavelength processing in the optical fiber communication application. However, the birefringent properties of the optical crystals used in some AOTFs, such as $TeO_2$, are not attractive to non-polarized light used in general fiber communication systems.

The invention solved this problem by using an optical polarization power combiner in the optical drop multiplexer and an optical polarization power splitter in the wavelength division add multiplexer. In addition, the invention provides a method capable of selecting the wavelength of drop and add optical signals accurately by dynamically scanning the radio frequency signals driving the AOTF. This method is particularly effective to wavelength division add/drop multiplexing in the coarse wavelength division multiplexer (CWDM) due to its low wavelength accuracy.

Figure 2:
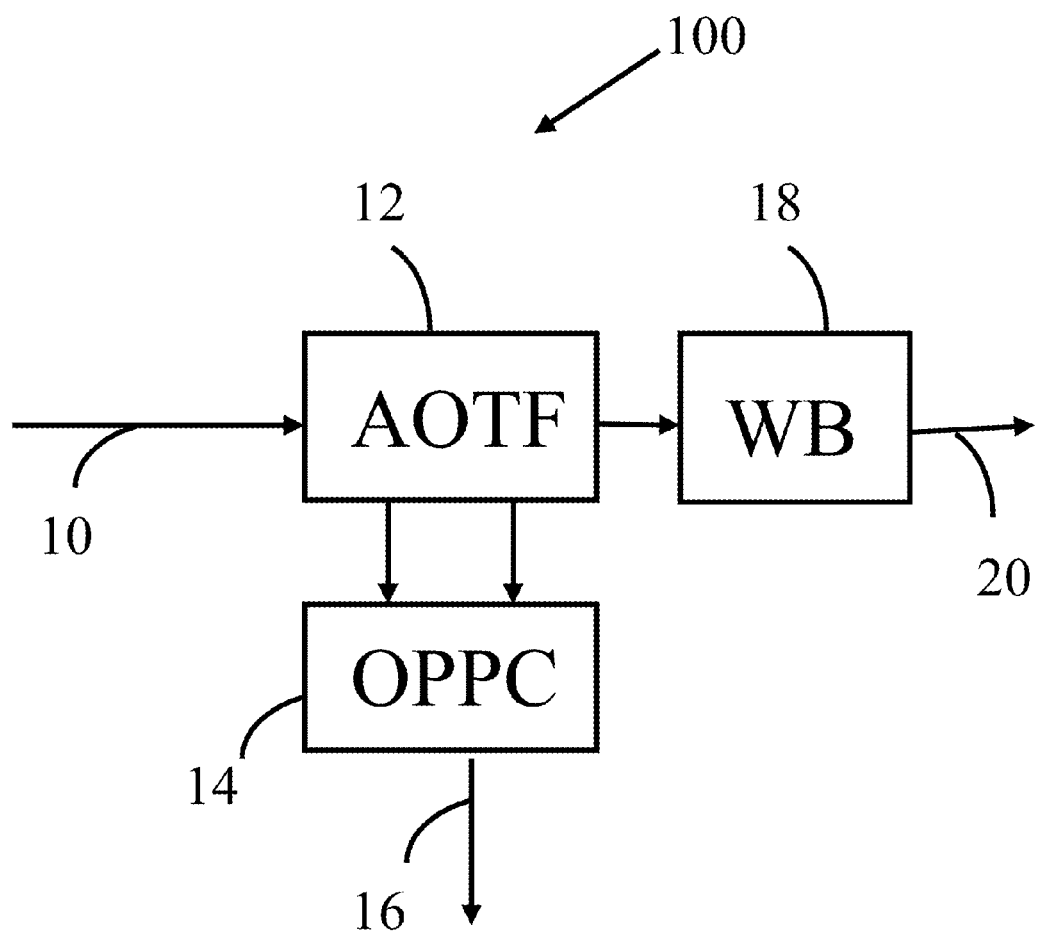
FIG. 2 is a block diagram of an optical drop multiplexer.

FIG. 2 shows an optical drop multiplexer 100 comprising an acousto-optic tunable filter (AOTF) and a wavelength blocker (WB). The AOTF 12 (400 in FIG. 7) is connected to an optical polarization power combiner (OPPC) 14 (500 in FIG. 9) to form a drop port, and connected to a wavelength blocker 18 (1000 in FIG. 20) to block the residual signal of the dropped channel. The input port 10 receives an incident multi-wavelength signal, the signal dropped is transmitted to a port 16, and the output port of the AOTF 12 includes all the transmitted channels and a small percentage signal of the dropped channel. This is due to the zero-order diffracted light by the AOTF still containing part of the dropped channel. The residual signal of the dropped channel is blocked by the wavelength blocker WB 18. All the transmitted channels are multiplexed to an output port 20.

Figure 3:
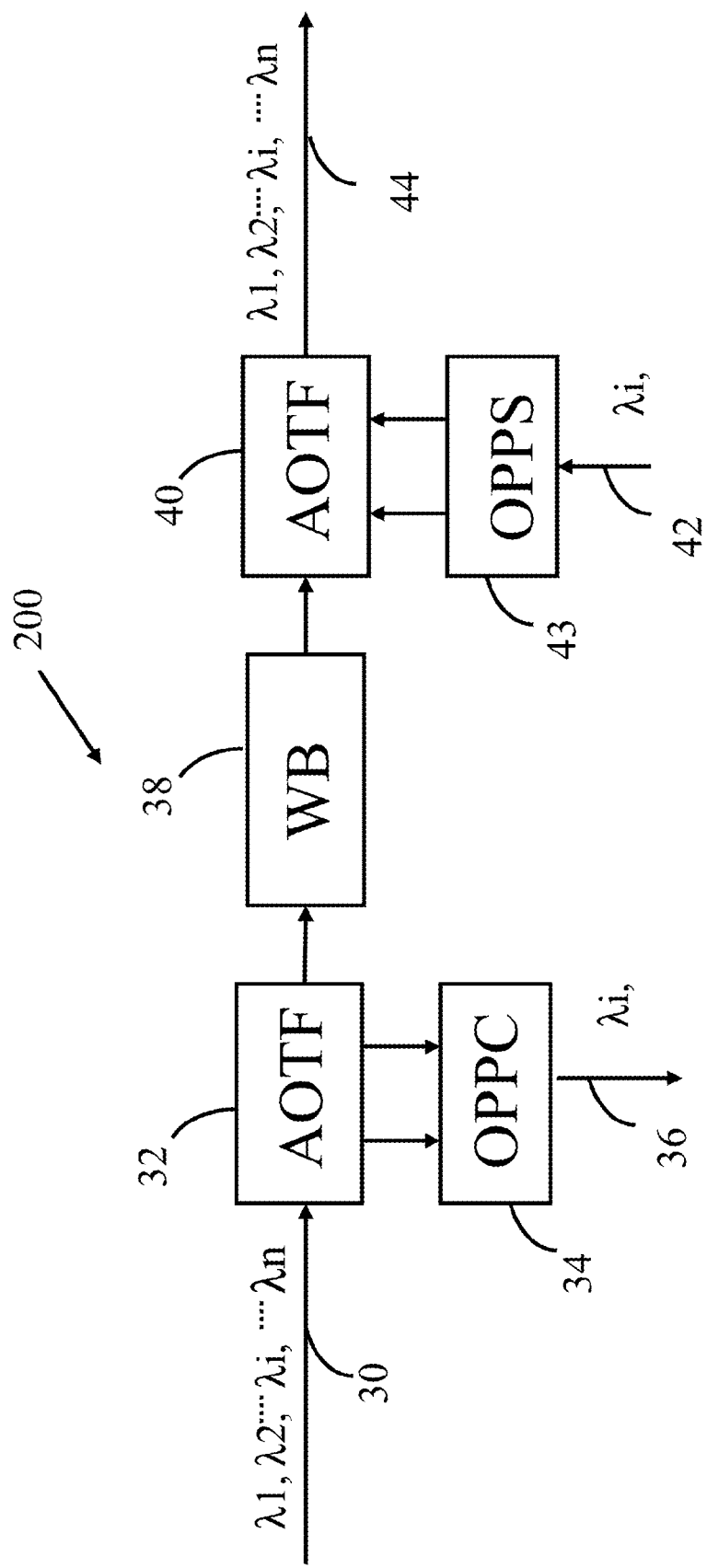
FIG. 3 is a block diagram of a reconfigurable optical add/drop multiplexer (ROADM)

FIG. 3 shows a reconfigurable optical add/drop multiplexer (ROADM) 200 with four ports, namely, an input port, a drop port, an add port, and an output port. ROADM 200 comprises an optical drop multiplexer 100 in FIG. 2, a wavelength block 38 in FIG. 20, and an optical add multiplexer 900 in FIG. 17. The input port 30 receives an initial multi-wavelength signal, and output the designated drop channel to port 36 through OPPC 34. A channel having the same wavelength as that of the dropped channel is added to the system via port 42. OPPS 43 splits the added channel into two linearly polarized components having mutually orthogonal polarization planes and inputs the linearly polarized components to AOTF 40 which then combines all the channels to output port 44. In one embodiment, the connection of devices 32 and 34, and devices 40 and 43 are coupled in free space. The connection of devices 32, 38 and 40 is implemented by fusing optical fiber pigtails from the above mentioned devices. ROADM 200 may comprise the functions of monitoring and equalizing the powers of all the channels.

Figure 4:
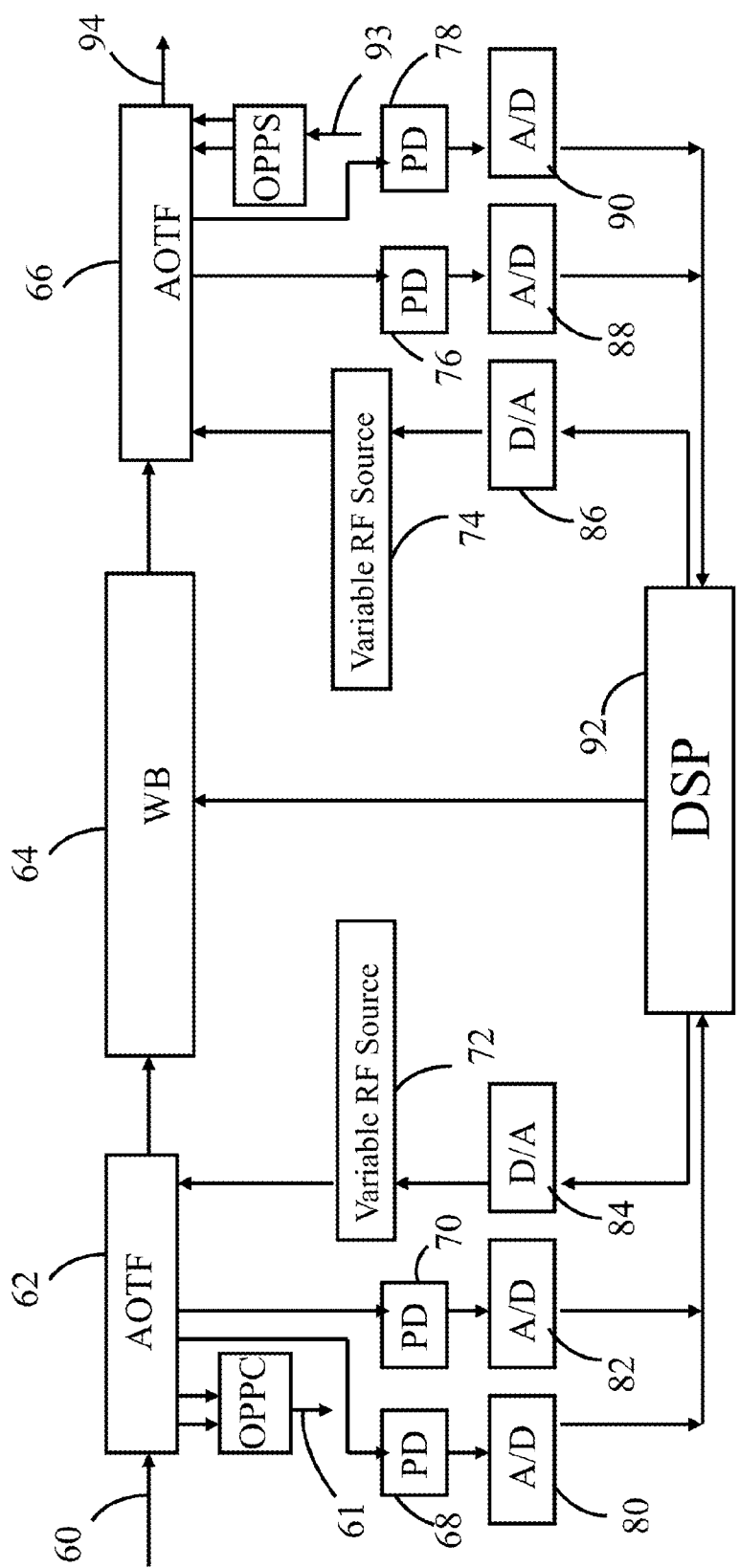
FIG. 4 is a block diagram of the system controlling principle of a reconfigurable optical add/drop multiplexer (ROADM)

The system controlling principle of the reconfigurable optical add/drop multiplexer (ROADM) is shown in FIG. 4, a digital signal processor (DSP) receives an external instruction to drop and add a particular channel, and radio frequency signal sources 72 and 74 are controlled by signals sent from digital/analog (D/A) device 84 and 86 so as to drive AOTF 62 and AOTF 66 respectively. AOTF 64 and 86 are respectively tuned to a particular channel to be dropped and a channel to be added. The DSP 92 further sends a signal to the WB 64 to block the residual signal of the dropped channel. Radio frequency signals driving AOTF 62 and 66 are scanned by the DSP 92, and diffraction intensities of an optical signal of the wavelength to be dropped and an optical signal of the wavelength to be added can be detected respectively by photo detectors (PD) 68, 70, 76, and 78, and are transmitted to the DSP 92 through analog/digital converters (A/D) 80, 82, 88, and 90. The maximal diffraction intensity can be located at a particular radio frequency point, that is, the optimal Bragg diffraction matching condition is realized by scanning radio frequency, and also the intensity of diffracted light can be detected.

Figure 5:
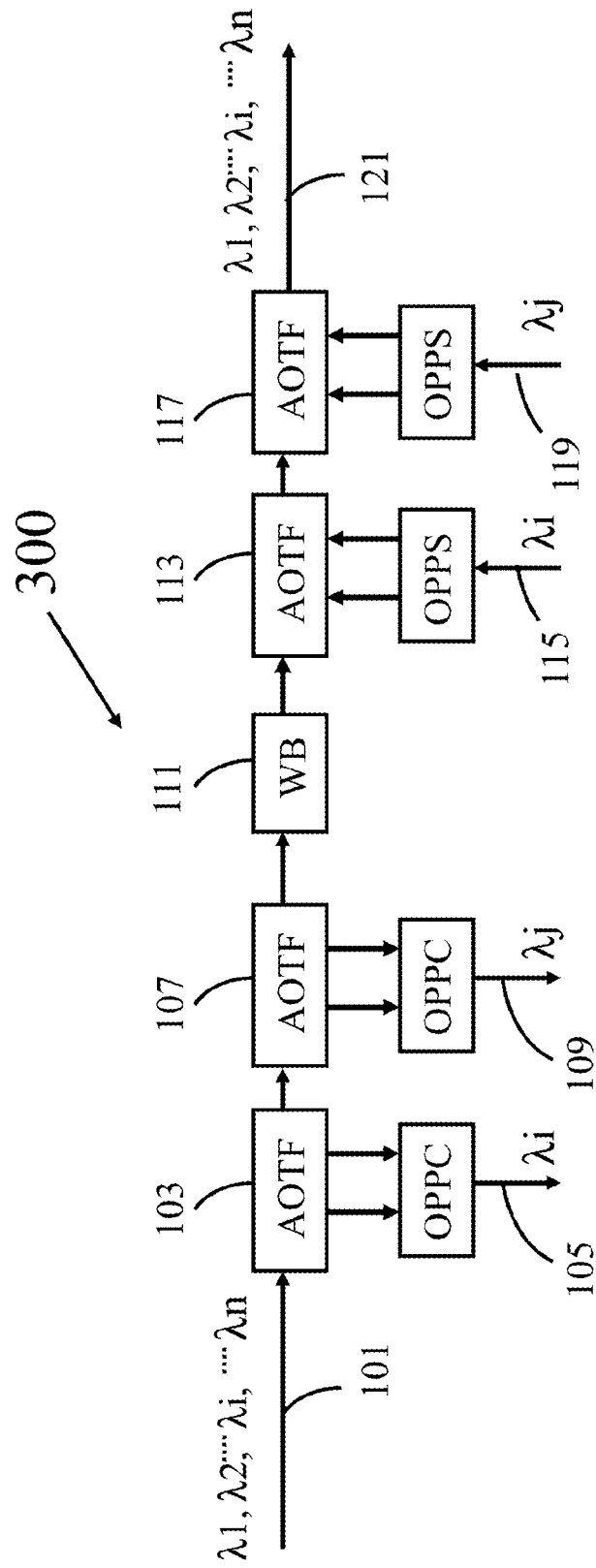
FIG. 5 is a block diagram of an extensible reconfigurable optical add/drop multiplexer (ROADM)

FIG. 5 shows an extended reconfigurable optical add/drop multiplexer (ROADM) 300, which is the extension of the ROADM 200 shown in FIG. 3, and comprises more than one colorless drop and add ports. More channels can be dropped by the addition of more optical drop multiplexers (600 shown as FIG. 11), and more channels are added by the addition of more optical add multiplexers (900 shown as FIG. 17). Each AOTF can be tuned to any particular wavelength within a designated spectral region, therefore, drop ports 105 and 109 as well as add ports 115 and 119 are all colorless. The capacity of a wavelength blocker WB 111 can also be extended within the designated spectral region to process channels in any quantity. Input ports 101 and 121 are typically single mode fibers, or the polarization maintaining (PM) fibers. Neither the ROADM 200 in FIG. 3 nor the ROADM 300 in FIG. 5 has mechanically movable components.

Figures 1, 6:
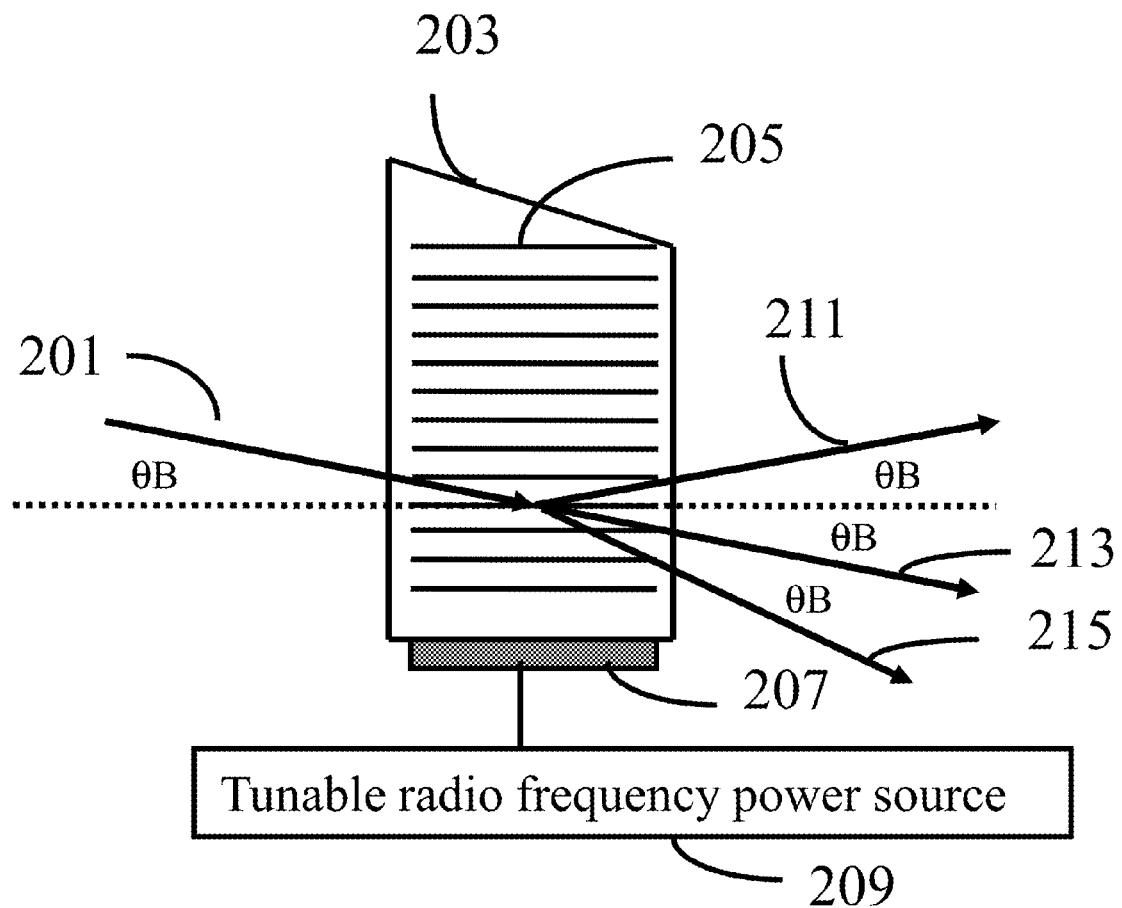
Figures 2, 6:
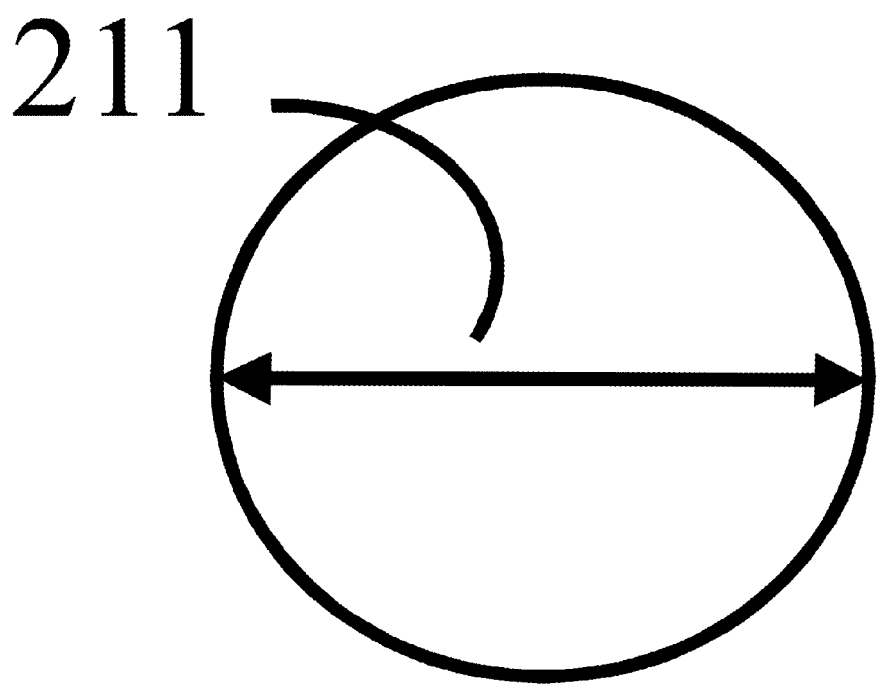
Figures 3, 6:
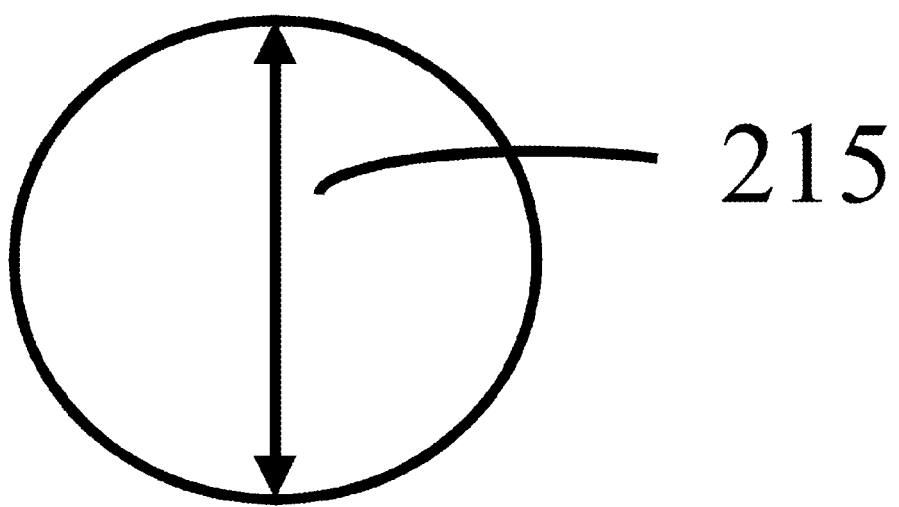
Figure 7:
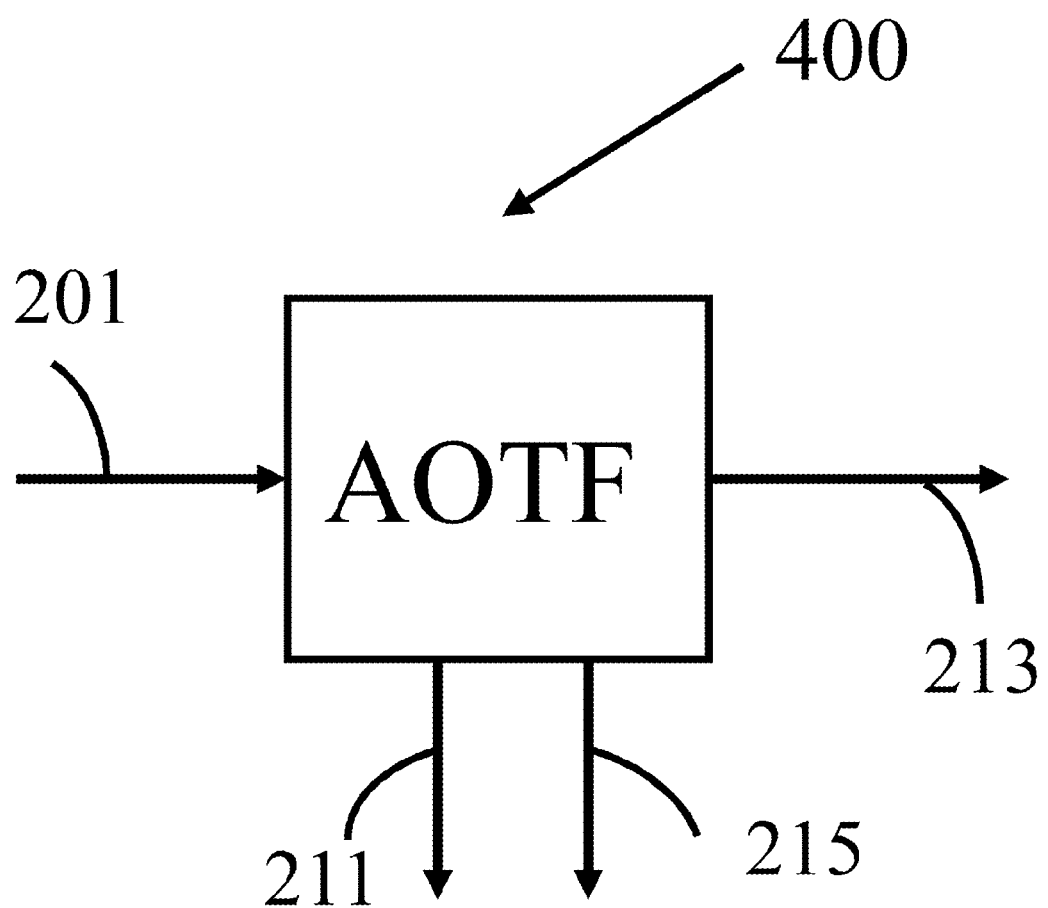
FIG. 7 is a block diagram of an acousto-optic tunable filter (AOTF) used in an optical drop multiplexer.

The structure of the acousto-optic tunable filter (AOTF) used in the optical drop multiplexer, shown as FIG. 6-1 and FIG. 7, comprises an acousto-optic crystal 203, a transducer 207 bonded at one end and a radio frequency power source 209 to drive the transducer. A collimated light 201 incident at a Bragg angle $\theta i=\theta B$ is diffracted by an acoustic wave field 205 in the acousto-optic crystal 203 to generate first-order lights 211 and 215 with an output angle $\theta B$ and a zero-order light 213 in the direction of the incident light 211. The lights 211 and 215 are linearly polarized lights, and the polarization plane of the lights 211 and 215 are orthogonal to each other as shown in FIG. 6-1 and FIG. 6-2. The optical wavelength satisfying the Bragg angle $\theta B$ can be changed by changing the radio frequency of the power source 209, thus the wavelengths of the first-order lights 211 and 215 are changed. There are other different AOTF structures. For example, two or more transducers are employed to enhance the performance of certain acousto-optic tunable filter. For the sake of convenience in description, a simplified block diagram is used for representing the AOTF shown as FIG. 6, and FIG. 7 is a block diagram of an AOTF in which identical numbers in FIG. 6 are used for indicating various input ports and output ports as well as the diffracted lights.

Figure 8:
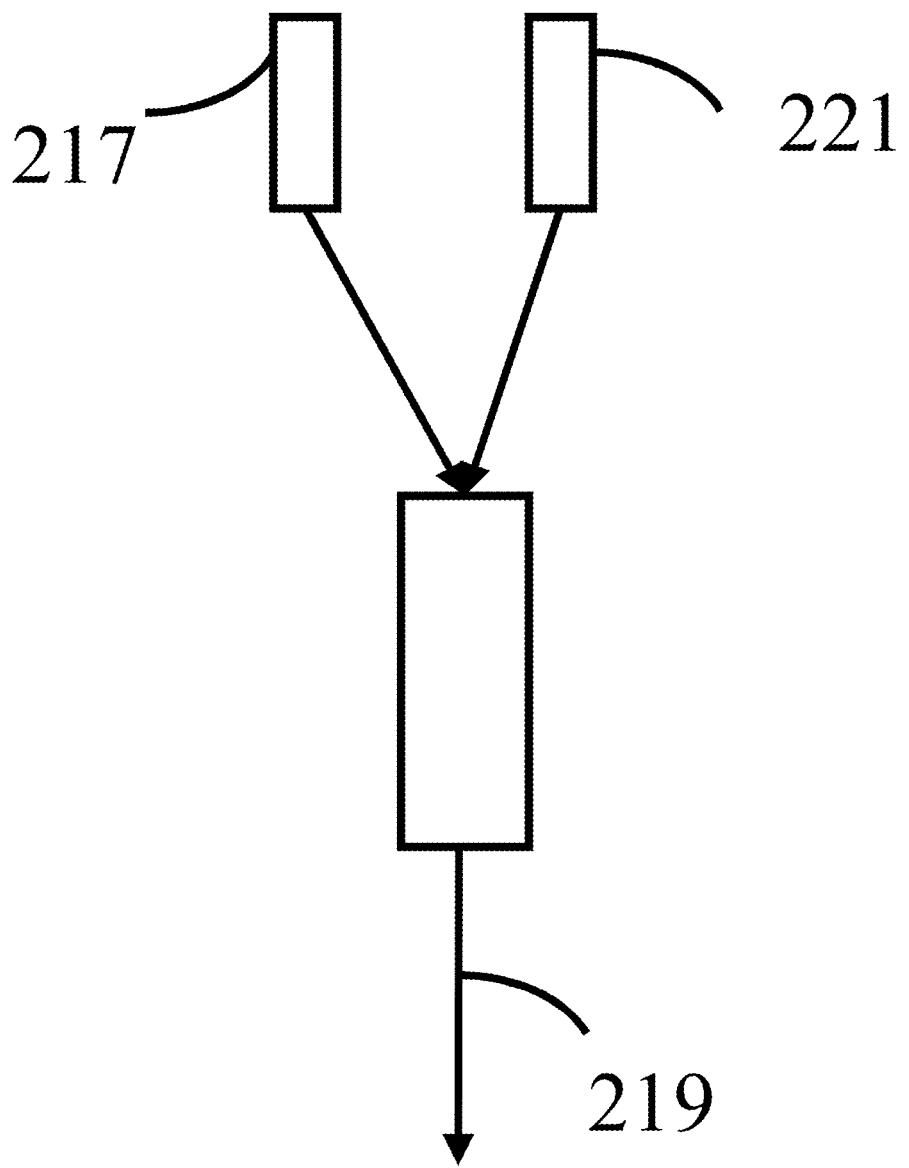
FIG. 8 is a plan view of a three-port optical polarization power combiner.
Figure 9:
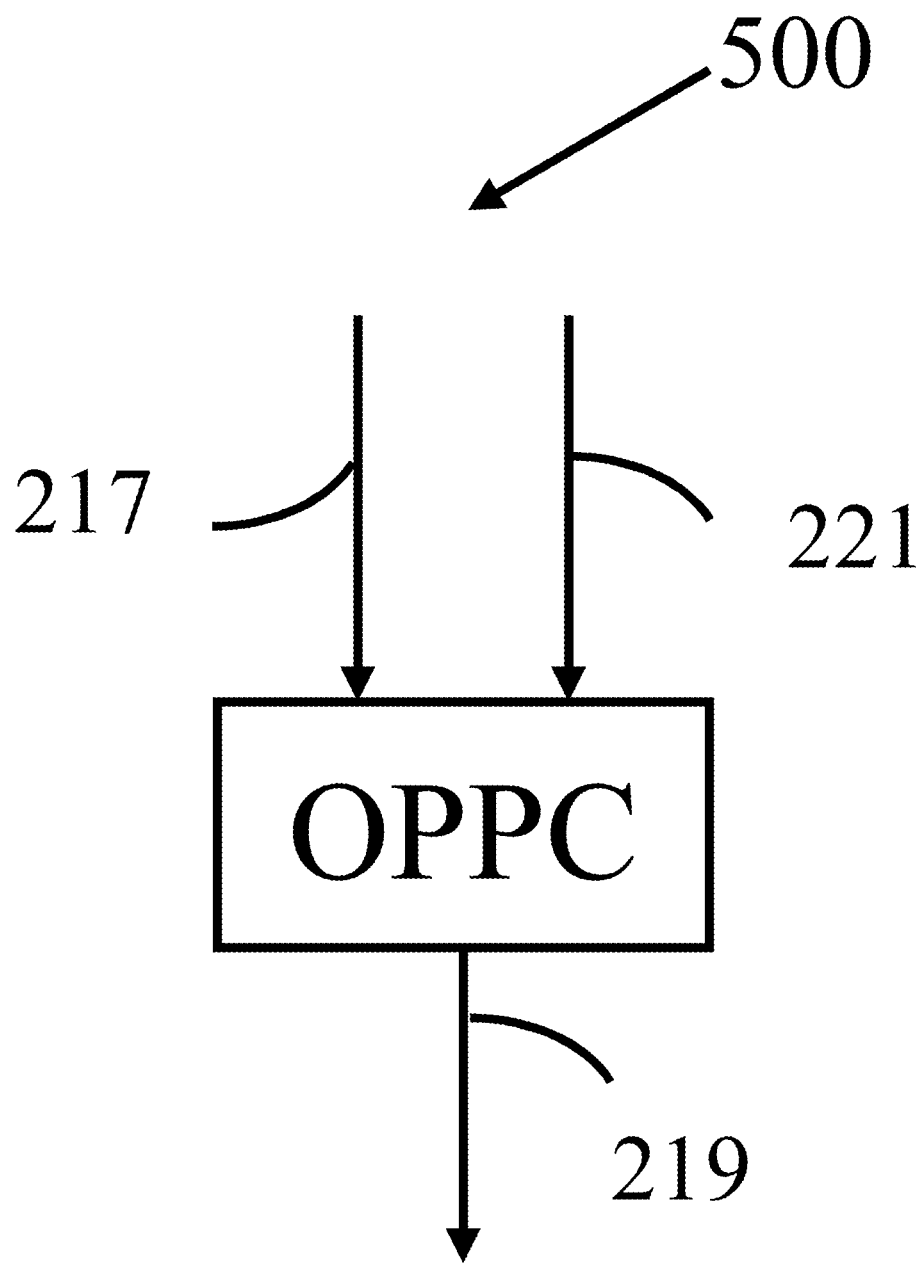
FIG. 9 is a simplified schematic diagram of FIG. 8.

The optical polarization power combiner (OPPC) is a three-port optical device having the function of combining two linearly polarized lights into one light. The optical polarization power combiner is usually designed to combine two linearly polarized lights orthogonal to each other into one light. The ports of this device for optical fiber communication all have pigtailed optical fibers. The structure of the optical polarization power combiner (OPPC) is shown as FIG. 8 and FIG. 9 with all output ports are optical fiber pigtailed with a GRIN lens for coupling input light to the optical fiber. The light input from ports 221 and 227 are combined into one light which is then outputted from an output port 219. The pigtailed fiber of the two input ports are polarization maintaining (PM) fibers, and the pigtailed fibers of the output ports are single mode fibers. FIG. 9 is a simplified schematic diagram of FIG. 8.

Figure 10:
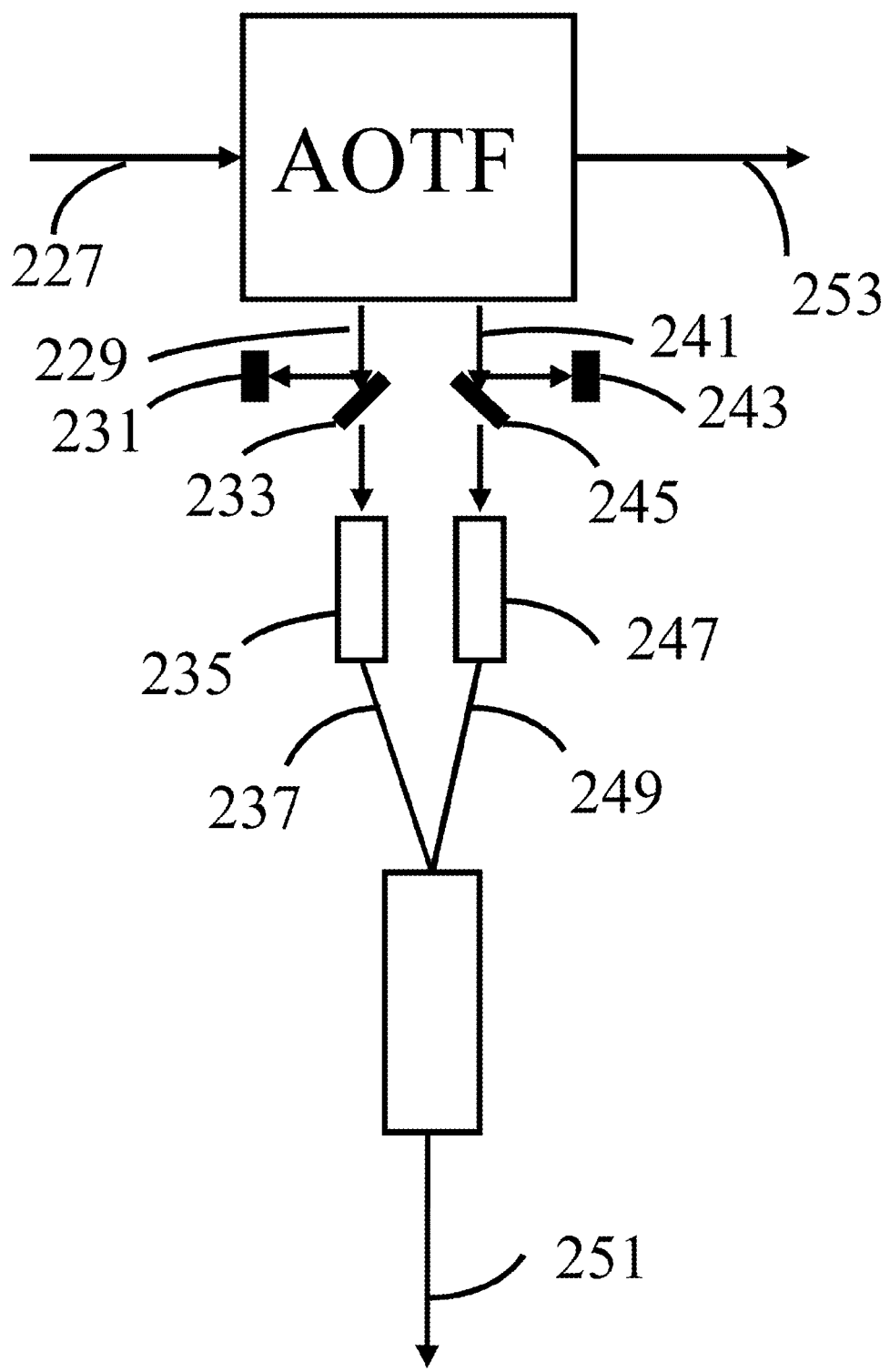
FIG. 10 shows a three-port optical drop multiplexer using an acousto-optic tunable filter (AOTF) and an optical polarization power combiner.
Figure 11:
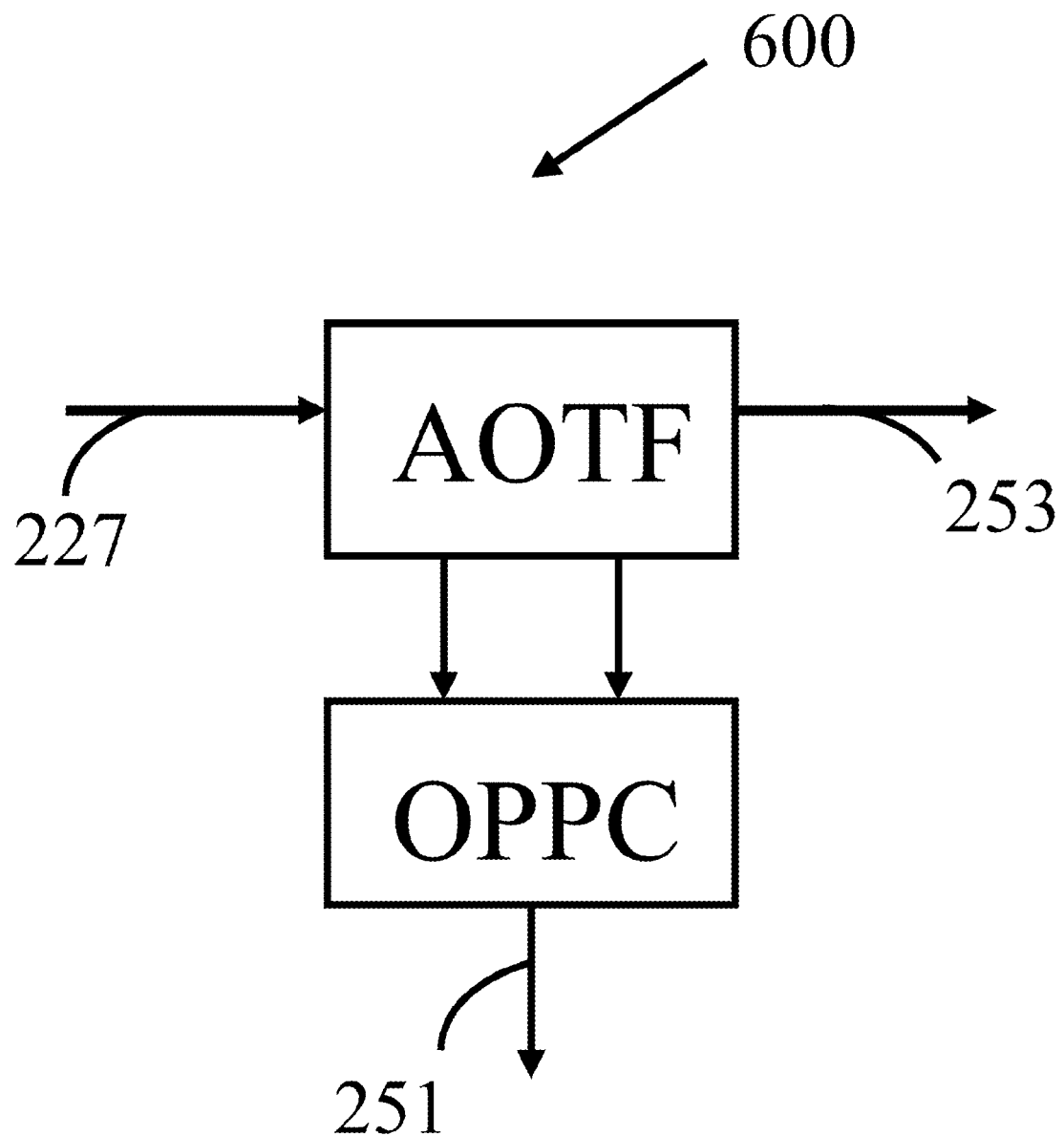
FIG. 11 is a simplified schematic diagram of FIG. 10.

A three-port optical separation multiplexer that uses the acousto-optic tunable filter (AOTF) (FIG. 12-1) and the optical polarization power combiner (OPPC) is shown as FIG. 10 and FIG. 11. The lights output from output ports 229 and 241 are reflected to photoelectric detectors 231 and 243 respectively by optical beam splitters 233 and 243 respectively, the reflectivity of the optical beam splitters 233 and 243 is approximately 5%. The lights passing through the optical beam splitters 233 and 243 are inputting to the input ports 235 and 247 of the OPPC. By scanning the radio frequency driving the AOTF, the optical wavelength of a drop channel can be determined accurately from the optical powers measured by PD 231 and 243. Its accuracy is, however, limited by the radio frequency scanning accuracy. The optical wavelength shifts of the drop channel in CWDM can be as large as 10 nanometers even within one channel. Therefore, this method is particularly effective to a CWDM system. FIG. 11 is a simplified block diagram showing the reconfigurable optical separation multiplexer 600 consisting of an AOTF and an OPPC.

Figures 1, 12:
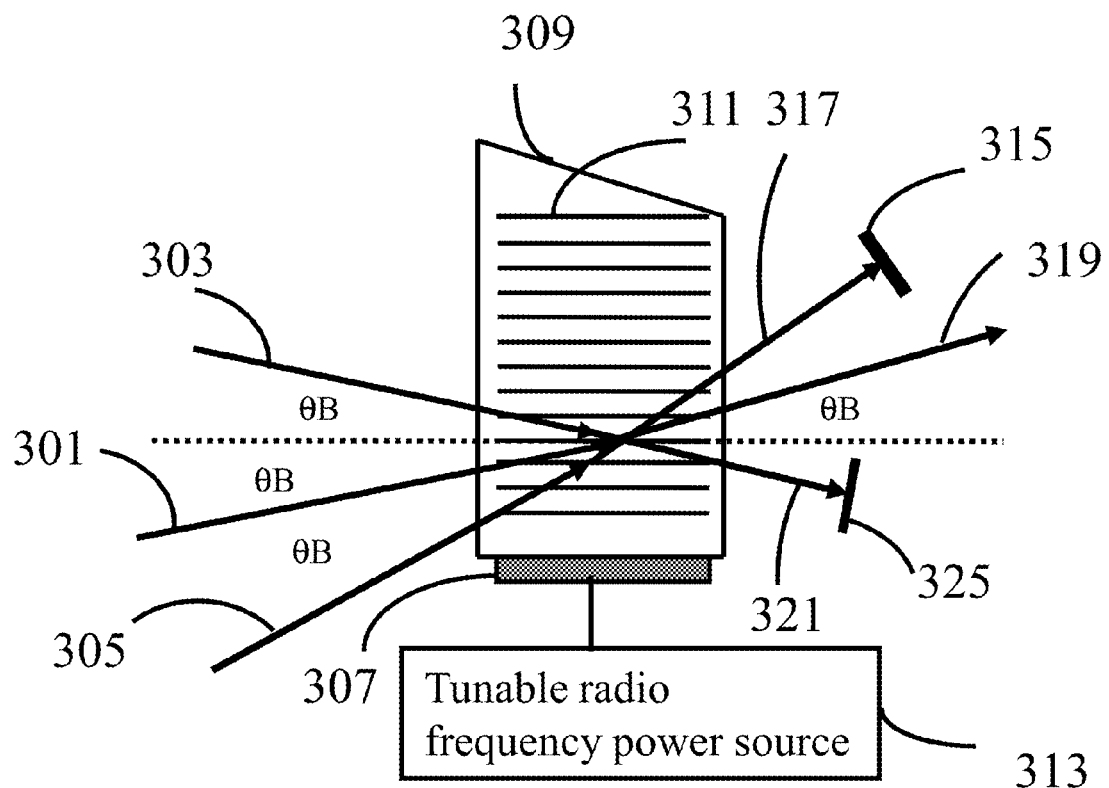
Figures 2, 12:
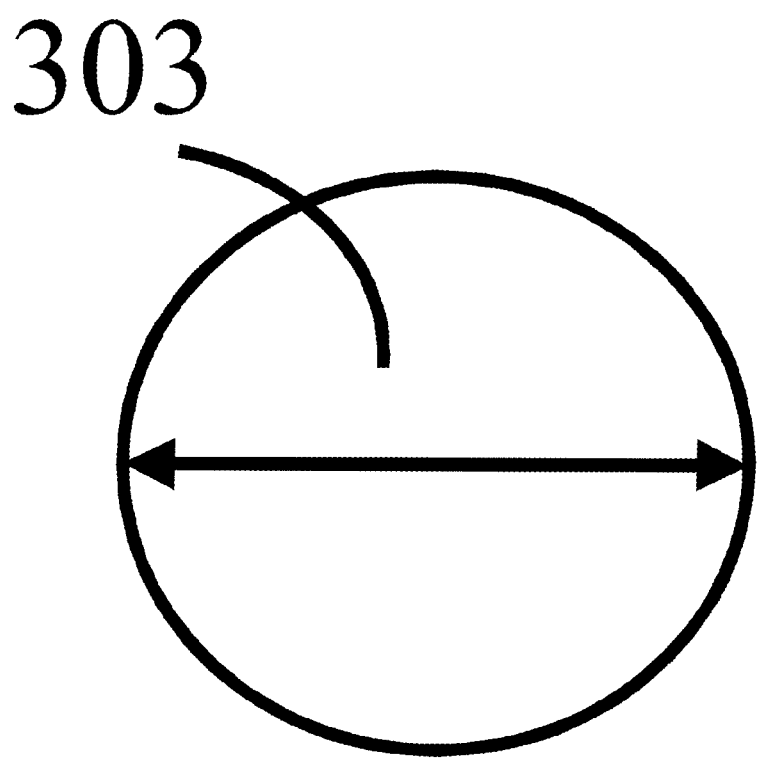
Figures 3, 12:
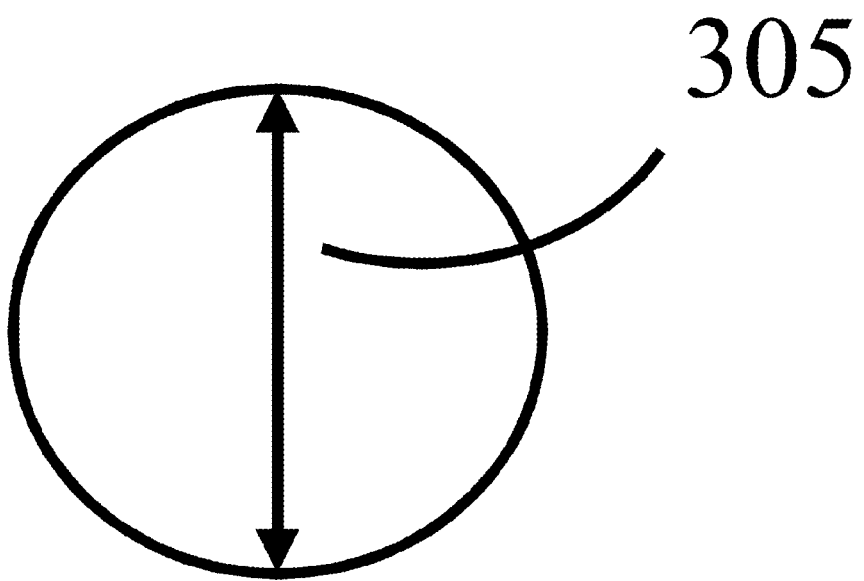
Figure 13:
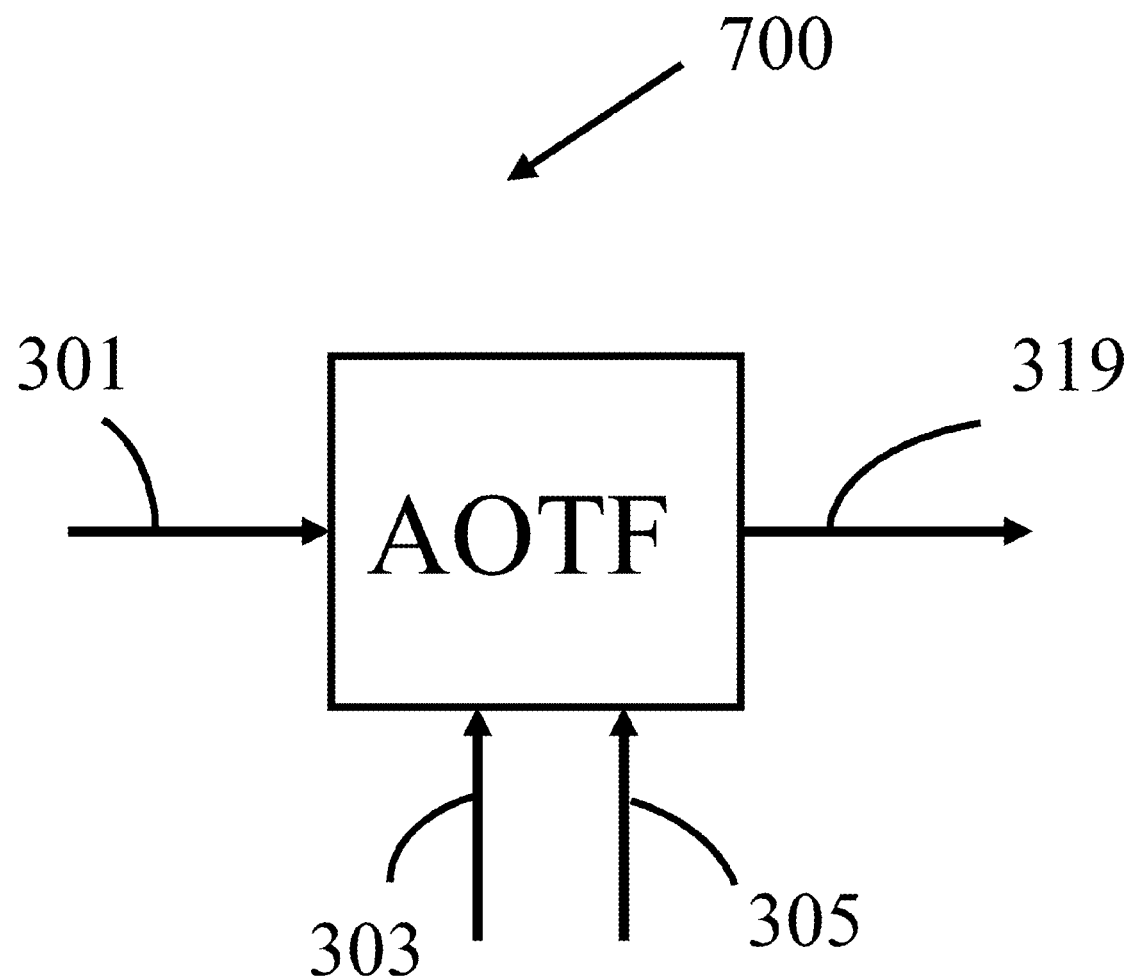
FIG. 13 is a block diagram of an acousto-optic tunable filter (AOTF) used in an optical add multiplexer.

The acousto-optic tunable filter (AOTF) in the optical add multiplexer is shown as FIG. 12-1 and FIG. 13. FIG. 12-1 shows a simple AOTF that can be used as the optical add multiplexer which comprises an acousto-optic crystal 309, a transducer 307 bonded at one end of the crystal 309 and a radio frequency power source 313 to drive the transducer. A collimated light 301, which is incident at a Bragg angle $\theta i=\theta B$ in the propagation direction of an acoustic wave field 311, includes all optical channels except for an optical channel to be added. The AOTF has been tuned to the optical channel to be added, so free transmission of all other channels in the acousto-optic crystal 303 can be realized. An OPPS (shown as FIG. 14) splits a non-polarized light in the optical channel to be added into two linearly polarized lights 303 and 305 with mutually orthogonal polarization plane. A light 303 is incident to the acousto-optic crystal 309 at a Bragg angle $\theta i=\theta B$ in a direction opposite to the propagation direction of the acoustic wave field 311, and a light 305 is incident to the acousto-optic crystal 309 at a Bragg angle $\theta i=\theta B$ with respect to the light 301 along the propagation direction of the acoustic wave field 311. FIG. 12-2 and FIG. 12-3 show the polarization plane of the lights 303 and 305 respectively. Zero-order diffraction lights 321 and 317 of the lights 303 and 305 are respectively input onto PD 325 and 315 in order to detect the optical power. FIG. 13 shows the simplified form of the AOTF 700 in FIG. 12-1.

Figure 14:
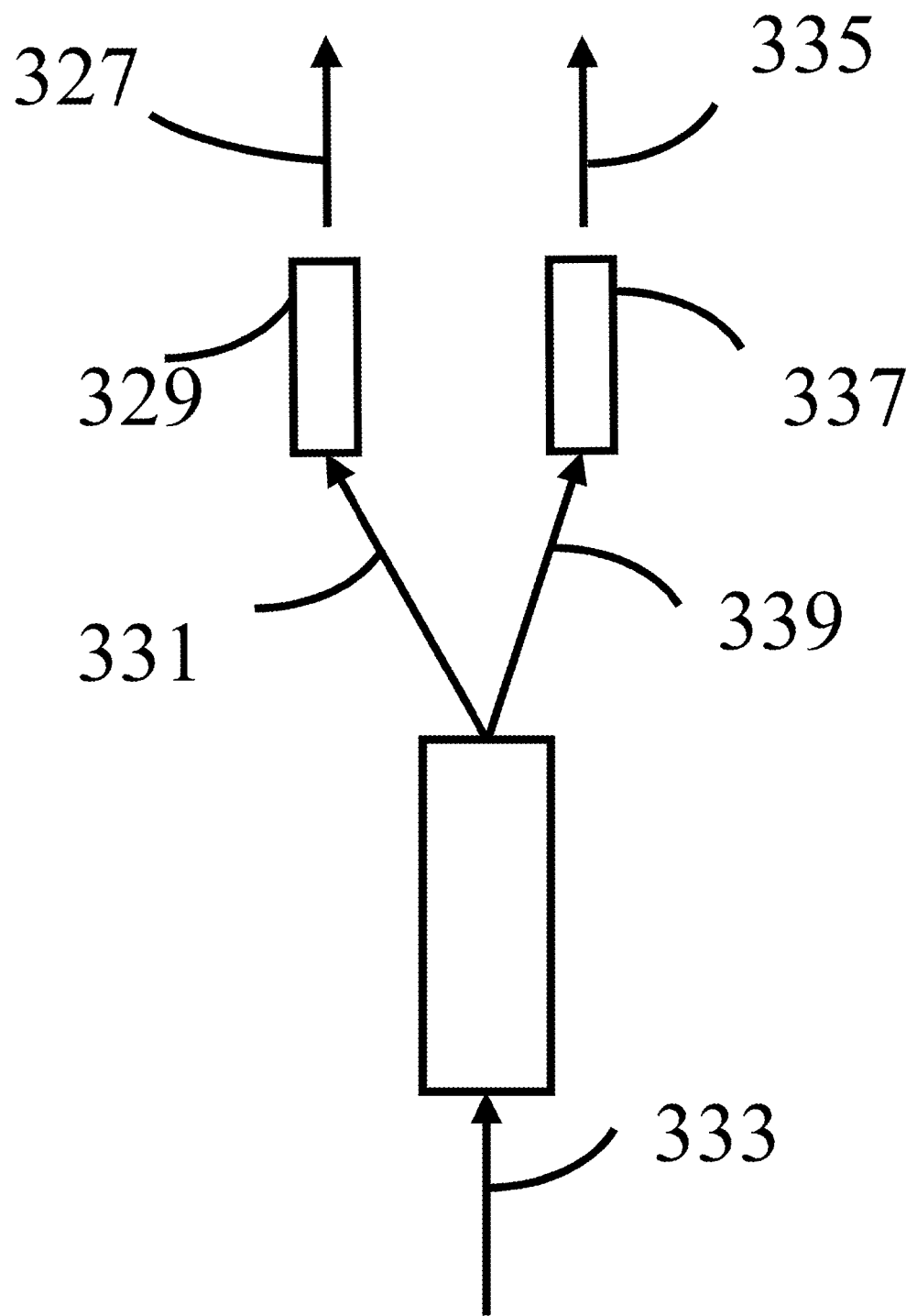
FIG. 14 is a plan view of a three-port optical polarization power splitter.
Figure 15:
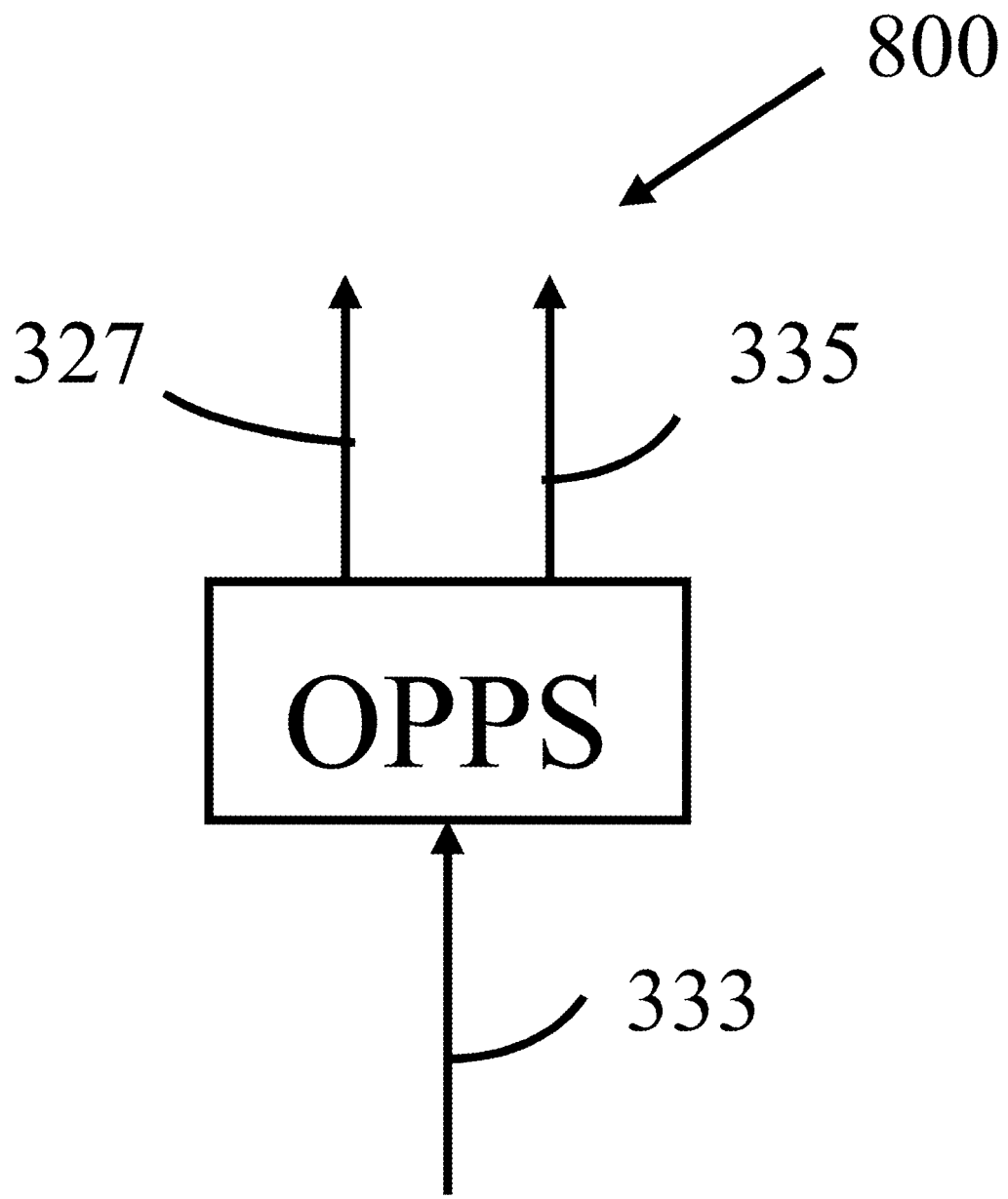
FIG. 15 is a simplified schematic diagram of FIG. 14.

FIG. 14 shows an optical polarization power splitter (OPPS) which is a three-port optical device having the function of splitting one non-linearly polarized light into two linearly polarized lights with mutually orthogonal polarization planes. The input and output ports of this device for optical fiber communications have optical fiber pigtails. The fiber pigtails of the output ports 329 and 337 are the polarization maintaining fibers, their pigtail ends are each equipped with a GRIN lens for collimating output lights. The fiber pigtail of the input port 333 is single mode fiber. FIG. 15 is a simplified schematic diagram of the optical polarization power splitter in FIG. 14.

Figure 16:
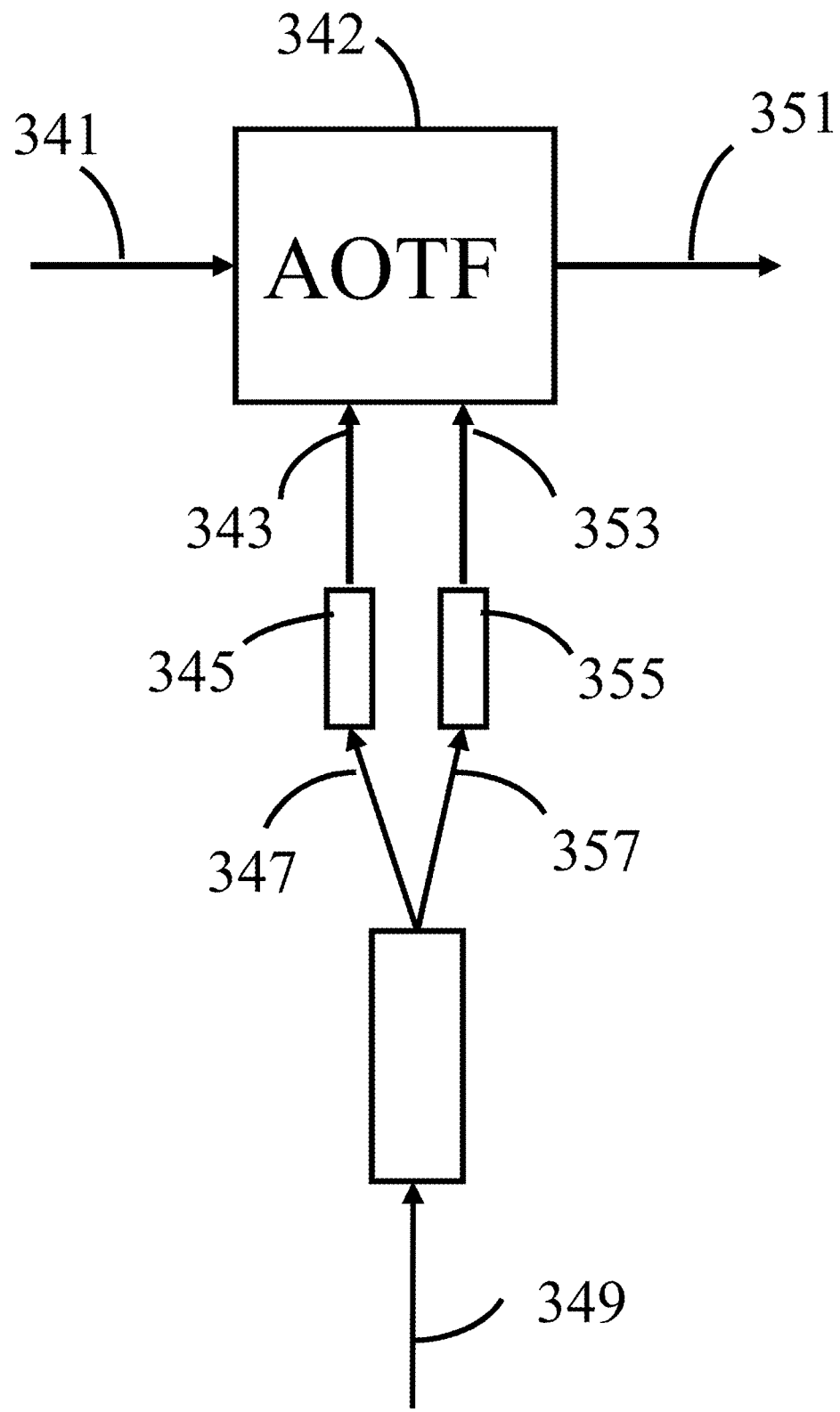
FIG. 16 shows a three-port optical add multiplexer using an acousto-optic tunable filter (AOTF) and an optical polarization power splitter.
Figure 17:
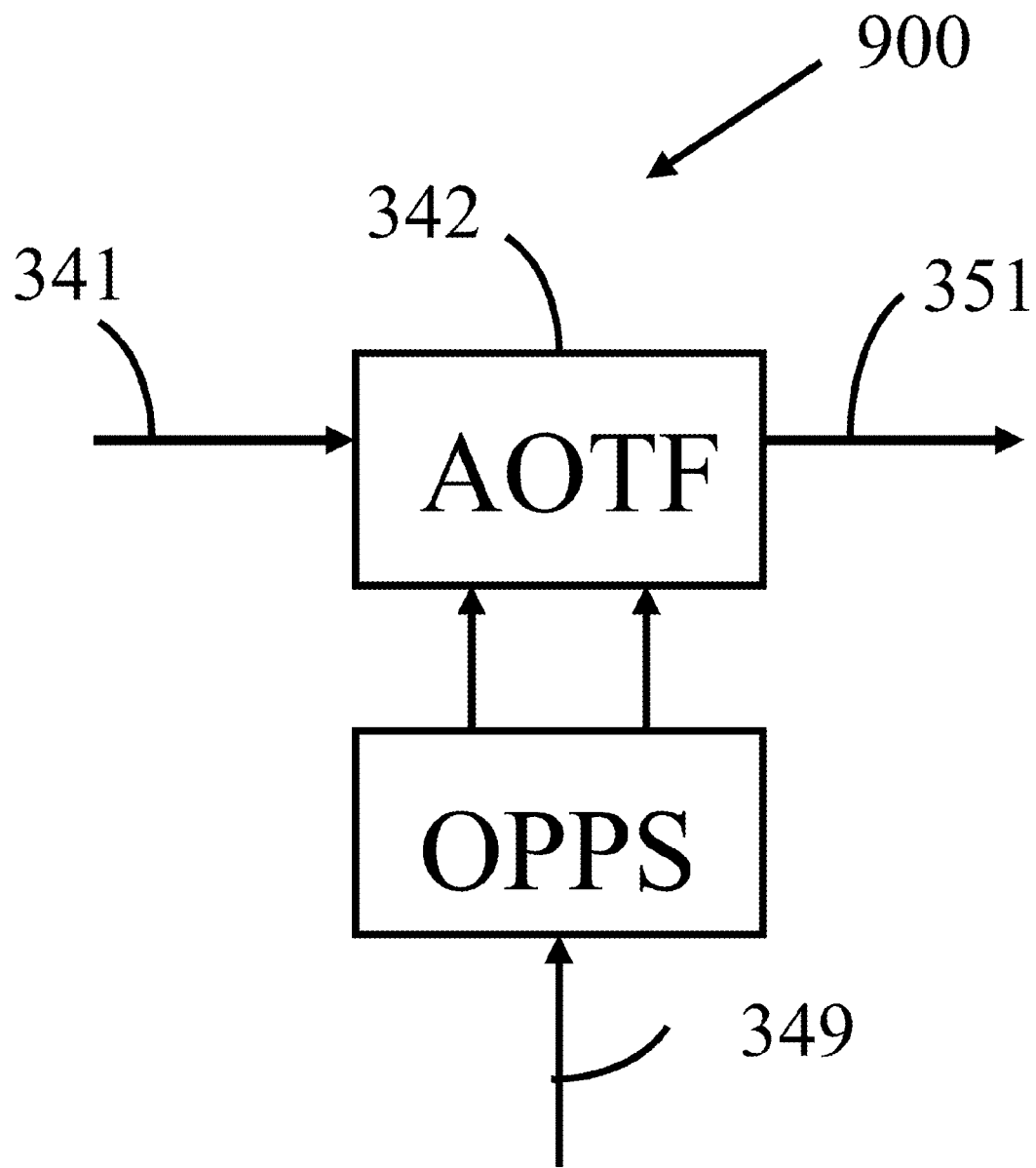
FIG. 17 is a simplified schematic diagram of FIG. 16.

FIG. 16 shows an optical add multiplexer, which has three-ports, and consists of an AOTF shown in FIG. 12-1 and an optical polarization power splitter shown in FIG. 14. An optical channel that needs to be added inputs to port 349, the OPPS splits the signal into two linearly polarized components to enter ports 347 and 357. Collimated lights outputting from the ports 345 and 355 inputs to ports 343 and 353 of AOTF 342, then combined by AOTF 342 and finally outputs to port 351. FIG. 17 is a simplified block diagram of the optical add multiplexer 900 shown in FIG. 16.

Figure 18:
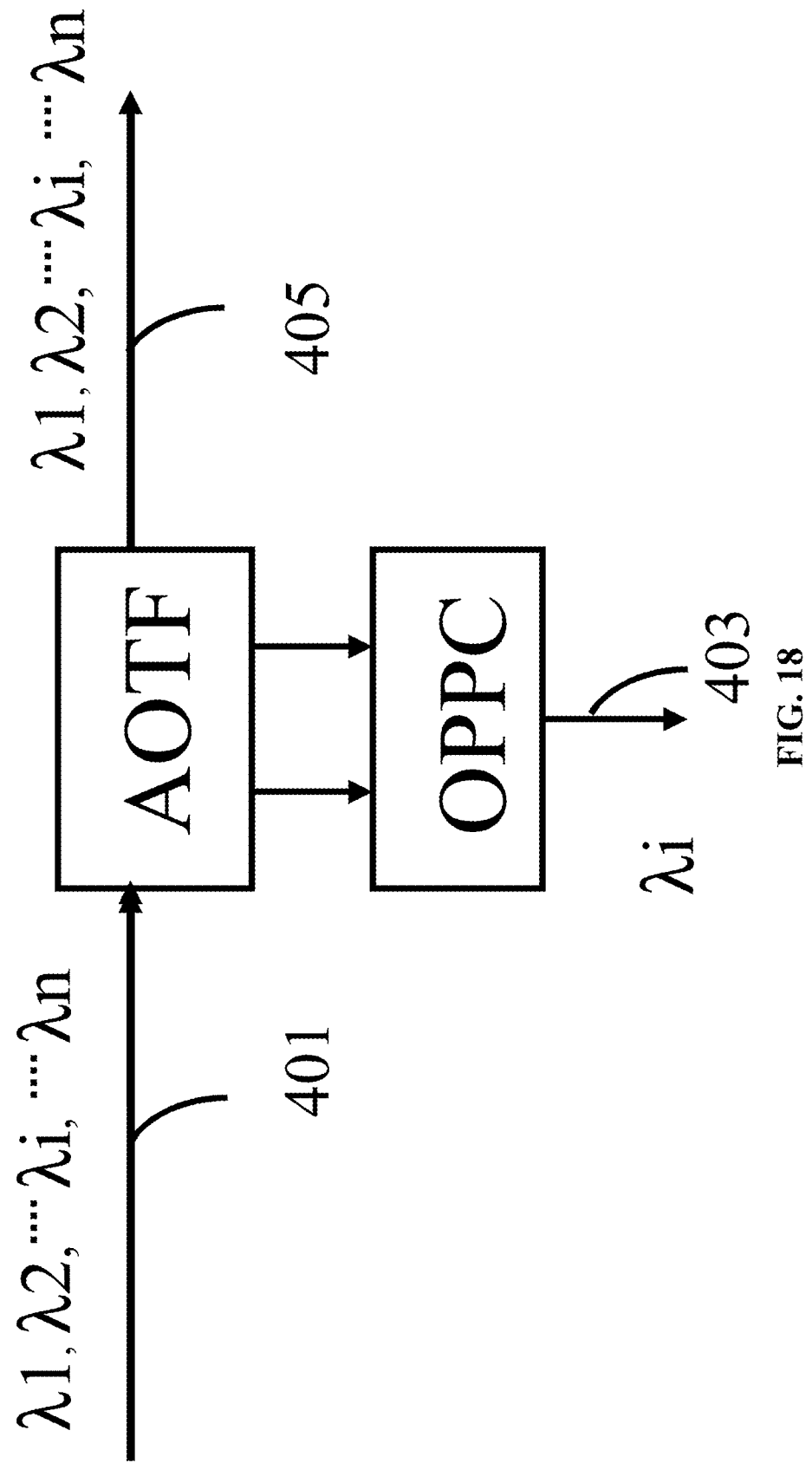
FIG. 18 shows the dropped wavelength and the transmitted wavelength after a multi-wavelength signal is input to an optical drop multiplexer.

FIG. 18 shows the wavelength dropped and the wavelength transmitted after the multi-wavelength signal is input to the optical drop multiplexer.

Figure 19:
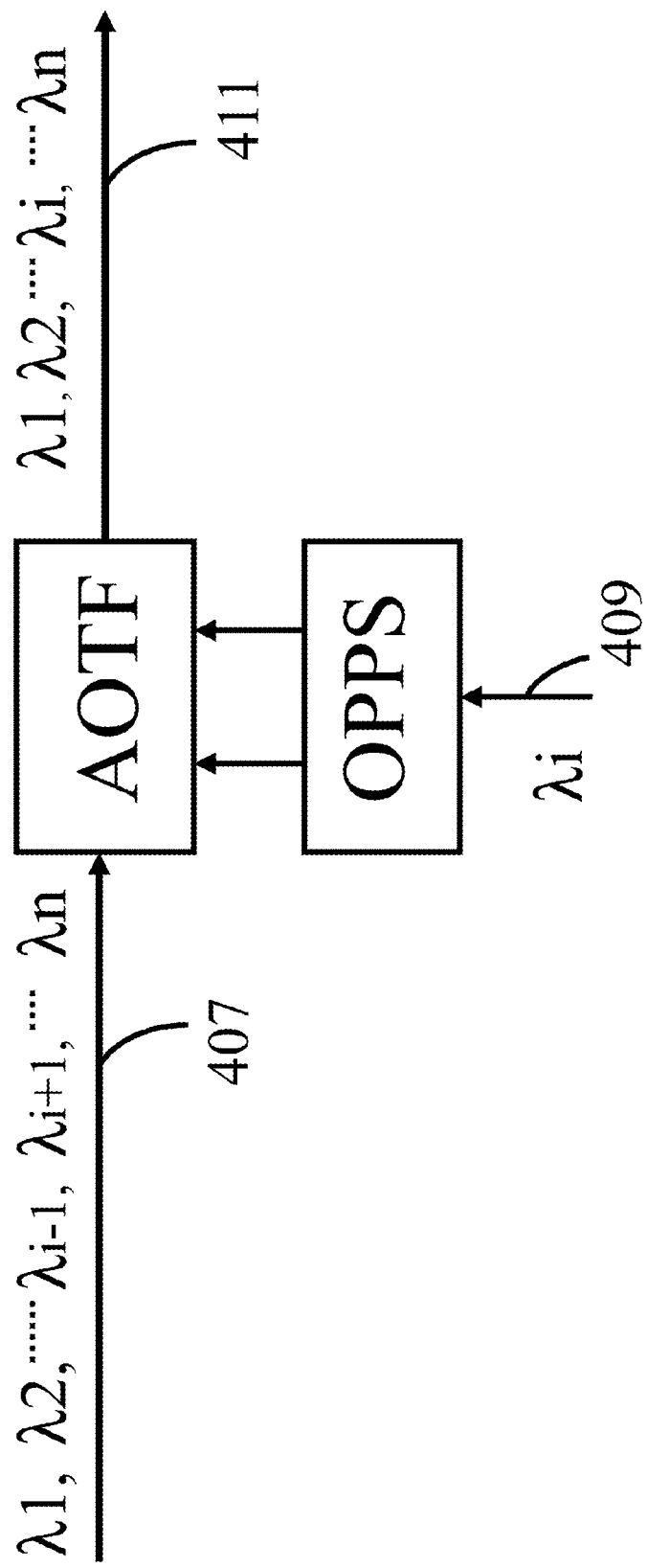
FIG. 19 shows the added wavelength and the outputted wavelength after a multi-wavelength signal is input to an optical add multiplexer.

FIG. 19. shows the wavelength added and the wavelength output after the multi-wavelength signal is input to the optical add multiplexer.

Figure 20:
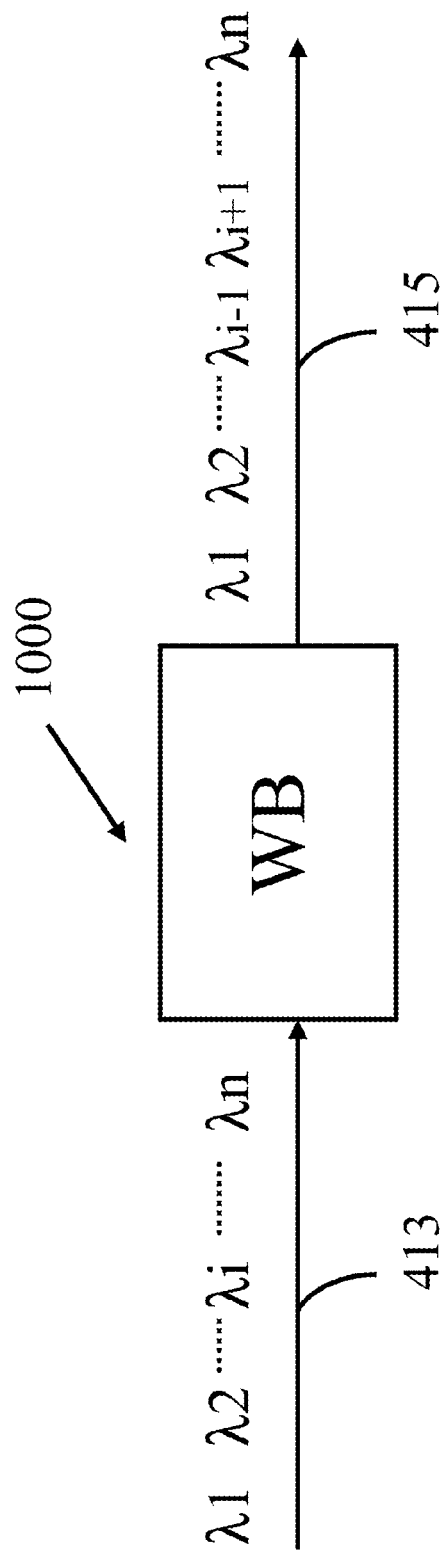
FIG. 20 is a block diagram of a wavelength blocker.

FIG. 20 shows a wavelength blocker (WB) 1000, which is capable of blocking one or more channels and passes other channels. The wavelength blocker 1000 blocks any channel $\lambda i$ (i is from 1 to n) in an input signal 413 selectively according to the external instruction, and the other channels pass through the wavelength blocker to become output signal 415. In addition, other functions, such as optical power detection and power balancing of channels, can also be implemented and added to the wavelength blocker.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An optical add/drop multiplexer, comprising:
   a) one or more optical drop multiplexers connected in free space or fused by fiber pigtails;
   b) a wavelength blocker;
   c) one or more optical add multiplexers connected in the free space or fused by fiber pigtails;
   d) a digital signal processor;
   e) an analog-to-digital signal converter;
   f) a digital-to-analog signal converter; and
   g) a plurality of electronic control and feedback loops;
   wherein
   the optical drop multiplexer comprises three ports: an input port used for receiving a multi-wavelength signal, a drop port used for outputting a drop signal, and an output port used for transmitting the multi-wavelength signal to a next optical drop multiplexer or to an input port of the wavelength blocker;
   the input port of the wavelength blocker is connected to the output port of the optical drop multiplexer through the fusion of the fiber pigtails, and is used to receive the multi-wavelength signal, block a selected wavelength, and transmit other wavelengths to an output port;
   the optical add multiplexer comprises three ports: an input port connected to the output port of the wavelength blocker, and used to receive the multi-wavelength signals except the drop signal, an add port used for inputting an add signal, and an output port used for transmitting the multi-wavelength signal to the next optical add multiplexer or to a multi-wavelength signal processing system;
   the digital signal processor is used for receiving, outputting, and processing digital and analog electronic signals;
   the analog-to-digital signal converter is used for receiving an optical power signal output from the drop multiplexer and the add multiplexer, and converting an analog signal into a digital signal, and outputting the digital signal to the digital signal processor for signal processing;
   the digital-to-analog converter is used for receiving a signal sent from the digital signal processor, converting the digital signal into an analog signal, and outputting the analog signal to a radio frequency signal source for tuning the wavelength of the drop or add signal; and
   the plurality of electronic control and feedback loops are used for tuning and scanning an optical wavelength.

2. The optical add/drop multiplexer of claim 1, wherein the multi-wavelength signal is a multi-channel coarse wavelength division multiplexed signal, or a multi-channel dense wavelength division multiplexed signal.

3. The optical add/drop multiplexer of claim 2, wherein a wavelength spacing between adjacent channels of the multi-channel coarse wavelength division multiplexing signal is approximately 20 nanometers.

4. The optical add/drop multiplexer of claim 2, wherein a wavelength spacing between adjacent channels of the multi-channel dense wavelength division multiplexing signal is approximately 0.8 nanometers in a 100 GHz DWDM system, or approximately 0.4 nanometers in a 50 GHz DWDM system.

5. The optical add/drop multiplexer of claim 1, wherein the optical drop multiplexer further comprises an acousto-optic tunable filter, an optical polarization power combiner, first and second optical beam splitters, first and second optical power detectors;
   the multi-wavelength signal is incident, at a Bragg angle, to the acousto-optic tunable filter in a direction opposite to an acoustic wave propagation direction;
   the first and the second optical beam splitters are disposed between the acousto-optic tunable filter and the optical polarization power combiner to reflect a part of light outputted from the acousto-optic tunable filter to the first and the second optical power detectors respectively; and
   the optical signal transmitted from the optical beam splitters is input to the optical polarization power combiner.

6. The optical add/drop multiplexer of claim 5, wherein the acousto-optic tunable filter comprises an acousto-optic crystal, one or more transducers bonded to the acousto-optic crystal, and an electric RF power source for providing a radio frequency signal to drive the acousto-optic tunable filter, and detecting and processing an incident optical signal by changing the frequency of the radio frequency signal.

7. The optical add/drop multiplexer of claim 5, wherein the optical polarization power combiner comprises first and second input ports having polarization maintaining fiber pigtails with GRIN lenses at pigtail ends for light signal collimating, and one output port with a pigtailed single mode fiber; the optical polarization power combiner combines two linearly polarized optical signals with the polarization planes orthogonal to each other from the acousto-optic tunable filter, into a drop signal, and then outputs the drop signal to the output port.

8. The optical add/drop multiplexer of claim 5, wherein the optical properties of the acousto-optic tunable filter meet optical spectrum requirements of the multi-wavelength signal.

9. The optical add/drop multiplexer of claim 5, wherein the spectral characteristics of the optical power detector are within an input signal spectral region.

10. The optical add/drop multiplexer of claim 5, wherein the acousto-optic crystal is an anisotropic birefringent crystal.

11. The optical add/drop multiplexer of claim 5, wherein a surface receiving or outputting optical signals of the acousto-optic crystal is coated with anti-reflection dielectric thin films.

12. The optical add/drop multiplexer of claim 5, wherein the reflectivity of the first and second light splitters is approximately 5% and the transmittance of the first and second light splitters is approximately 95%.

13. The optical add/drop multiplexer of claim 1, wherein the optical add multiplexer further comprises an acousto-optic tunable filter, an optical polarization power splitter, and third and fourth optical power detectors;
   the optical polarization power splitter receives the multi-wavelength signal from the output port of the wavelength blocker and splits the multi-wavelength signal into two linearly polarized lights with the planes of polarization orthogonal to each other in the horizontal and vertical directions;
   the linearly polarized light in the horizontal direction is incident, at a Bragg angle, to the acousto-optic tunable filter in the direction opposite to the acoustic wave propagation direction;
   the linearly polarized light in the vertical direction is incident, at a Bragg angle, with respect to an incident angle of the multi-wavelength signal, to the acousto-optic tunable filter in the same direction as the acoustic wave propagation direction; and the third and the fourth optical power detectors are used for receiving zero-order optical signals of the two add signals from the acousto-optic tunable filter.

14. The optical add/drop multiplexer of claim 13, wherein the acousto-optic tunable filter comprises an acousto-optic crystal, one or more transducers bonded to the acousto-optic crystal, and an electric RF power source for providing a radio frequency signal to drive the acousto-optic tunable filter, and detecting and processing an incident optical signal by changing the frequency of the radio frequency signal.

15. The optical add/drop multiplexer of claim 13, wherein the optical polarization power splitter comprises first and second output ports having polarization maintaining fiber pigtails with GRIN lenses at pigtail ends for light signal collimating, and one input port with a pigtailed single mode fiber; the optical polarization power splitter splits the add signal into two linearly polarized signals with planes of polarization orthogonal to each other, and then outputs the optical signals to the acousto-optic tunable filter at a Bragg angle.

16. The optical add/drop multiplexer of claim 13, wherein the optical properties of the acousto-optic tunable filter meet optical spectrum requirements of the multi-wavelength signal.

17. The optical add/drop multiplexer of claim 13, wherein the spectral characteristics of the optical power detector are within an input signal spectral region.

18. The optical add/drop multiplexer of claim 13, wherein the acousto-optic crystal is an anisotropic birefringent crystal.

19. The optical add/drop multiplexer of claim 13, wherein a surface receiving or outputting optical signals of the acousto-optic crystal is coated with anti-reflection dielectric thin films.

20. The optical add/drop multiplexer of claim 1, wherein the input port, drop port, add port, and output port are all provided with single mode fibers.

* * * * *